US012180037B2

(12) United States Patent
Bauer et al.

(10) Patent No.: US 12,180,037 B2
(45) Date of Patent: Dec. 31, 2024

(54) HANDRAIL-TREATMENT DEVICE FOR PASSENGER-CONVEYING INSTALLATIONS

(71) Applicant: INVENTIO AG, Hergiswil (CH)

(72) Inventors: Wolfgang Bauer, Rohrbach (AT); Michael Haider, Pöttsching (AT); Wolfgang Neszmerak, Wienerbergstraße (AT)

(73) Assignee: Inventio AG, Hergiswil (CH)

( * ) Notice: Subject to any disclaimer, the term of this patent is extended or adjusted under 35 U.S.C. 154(b) by 79 days.

(21) Appl. No.: 18/005,578

(22) PCT Filed: Jun. 17, 2021

(86) PCT No.: PCT/EP2021/066518
§ 371 (c)(1),
(2) Date: Jan. 13, 2023

(87) PCT Pub. No.: WO2022/012856
PCT Pub. Date: Jan. 20, 2022

(65) Prior Publication Data

US 2023/0312308 A1 Oct. 5, 2023

(30) Foreign Application Priority Data

Jul. 17, 2020 (EP) .................................... 20186516

(51) Int. Cl.
*B66B 31/02* (2006.01)
*B66B 21/04* (2006.01)
(Continued)

(52) U.S. Cl.
CPC .............. *B66B 31/02* (2013.01); *B66B 23/24* (2013.01); *B66B 21/04* (2013.01); *B66B 21/10* (2013.01); *B66B 25/003* (2013.01)

(58) Field of Classification Search
None
See application file for complete search history.

(56) References Cited

U.S. PATENT DOCUMENTS 1,158,765 A * 11/1915 Kim ........................ B25B 15/02 81/28
10,160,622 B2 * 12/2018 Kim .......................... A61L 2/08
(Continued)

FOREIGN PATENT DOCUMENTS

CN 111348537 A * 6/2020
JP H08188369 A 7/1996
(Continued)

OTHER PUBLICATIONS

UV disinfection table with summaries.
International Search Report for International Application No. PCT/EP2021/066518 dated Sep. 8, 2021.

*Primary Examiner* — Kavel Singh
(74) *Attorney, Agent, or Firm* — Knobbe, Martens, Olson & Bear, LLP

(57) ABSTRACT

The disclosure relates to a handrail treatment device which comprises a housing and a cylindrical base body which is arranged in the housing so as to be rotatable about an axis of rotation. A cleaning facing is arranged on a cylinder outer surface of the base body, over which a circulating handrail of a passenger transport system can be guided for the purpose of removing dirt and germs. At least one radiation source is arranged inside the housing, which radiation source can emit germicidal electromagnetic radiation, wherein the radiation source is aligned with the base body in such a way that the cleaning facing moving continuously past the radiation source is exposed to the germicidal electromagnetic radiation of this radiation source when the base body rotates.

15 Claims, 5 Drawing Sheets

(51) Int. Cl.

| | |
|---|---|
| ***B66B 21/10*** | (2006.01) |
| ***B66B 23/24*** | (2006.01) |
| ***B66B 25/00*** | (2006.01) |

(56) References Cited

U.S. PATENT DOCUMENTS

| | | | | |
|---|---|---|---|---|
| 11,548,765 | B2 * | 1/2023 | Kim | B66B 29/04 |
| 2014/0294668 | A1 | 10/2014 | Lee | |
| 2014/0322073 | A1 * | 10/2014 | Link | A61L 2/10 250/492.1 |
| 2015/0028228 | A1 | 1/2015 | Almasy et al. | |

FOREIGN PATENT DOCUMENTS

| | | | |
|---|---|---|---|
| JP | 2006193319 | A | 7/2006 |
| KR | 20060108189 | A | 10/2006 |
| KR | 20110023060 | A | 3/2011 |
| KR | 20130002312 | U | 4/2013 |
| KR | 101839510 | B1 | 4/2018 |
| WO | WO 2019112356 | A1 | 6/2019 |
| WO | WO 2019164256 | A1 | 8/2019 |

* cited by examiner

HANDRAIL-TREATMENT DEVICE FOR PASSENGER-CONVEYING INSTALLATIONS

TECHNICAL FIELD

The present disclosure relates to a handrail treatment device, comprising at least one housing, a rotating cleaning facing, and a radiation source which can emit germicidal electromagnetic radiation, as well as a passenger transport system with at least one handrail treatment device and a method for controlling the handrail treatment device.

SUMMARY

Passenger transport systems that are designed as escalators or moving walkways usually have circulating handrails that move at the same speed as a conveyor belt on which the user can stand. This allows users to hold onto the handrails while moving. The region of the handrail where the user can hold on is referred to as the leading run, while the returning run is usually concealed from the users of the passenger transport system and is returned against the direction of transport.

When users' hands touch the surface of the handrails, bacteria, spores, and viruses get onto the handrail. The pathogens deposited in this way can multiply on the handrail and be transmitted to subsequent users. The handrail of such a passenger transport system thus represents an unhygienic place in public space where infectious diseases can be transmitted.

WO2019/164256A1 shows a handrail treatment device according to the prior art. In this case, a handrail is irradiated with ultraviolet light by means of radiation sources. This germicidal electromagnetic radiation destroys the deoxyribonucleic acid of these germs so that a significant reduction in microorganisms can be detected on the surface of the handrail from the exit side of this handrail treatment device. However, dirt sticking to the handrail can offer the bacteria and viruses sufficient protection so that they can survive the radiation treatment undamaged.

JP08188369A, for example, provides for extensive precleaning with rotating brushes and a washing system with germicidal fluids, so that the cleaned surface of the handrail can then be disinfected by the radiation of the UV lamp, in order to allow for even more thorough disinfection. However, such a handrail treatment device is very expensive and, in particular because of the fluids required, results in high operating costs.

The object of the present disclosure is therefore to render the pathogens adhering to the handrails harmless in an inexpensive and safe manner by means of a simple handrail treatment device.

This object is achieved by a handrail treatment device which comprises at least one housing and a cylindrical base body which is arranged in the housing so as to be rotatable about an axis of rotation. A cleaning facing is arranged on the cylinder outer surface of the cylindrical base body, over which cleaning facing a circulating handrail of an escalator or a moving walkway can be guided for the purpose of removing dirt particles. Furthermore, at least one radiation source that can emit germicidal electromagnetic radiation is arranged inside the housing. The radiation source is aligned with the base body in such a way that when the base body rotates, the cleaning facing moving continuously past the radiation source is exposed to the germicidal electromagnetic radiation of this radiation source.

The germicidal electromagnetic radiation to be used preferably has a wavelength range from 200 nm to 280 nm, particularly preferably from 250 nm to 260 nm, and can be generated, for example, by means of UV-C tubes or UV-C light-emitting diodes. The cleaning facing can be a bristle facing, a lamellar facing made of resilient material, and the like.

Because the cleaning facing is continuously exposed to the electromagnetic germicidal radiation, bacteria and viruses adhering to the cleaning facing are killed before its contaminated regions come into contact with the handrail again. In other words, irradiating the cleaning facing prevents these germs from being incorporated, for example, into fine cracks and depressions in the handrail by a cleaning facing that has not been sterilized, and from being transmitted to the users of the escalator or the moving walkway. By mechanically cleaning the handrail with a disinfected, rotating cleaning facing according to the present subject matter of the disclosure, the surfaces of the handrail are cleaned of dirt that has adhered to it and is contaminated with germs, so that overall the germ pressure (amount of germs present on these surfaces) is reduced.

With regard to the shape of the base body, "cylindrical" simply means that it is an elongated, rotatably mounted body. This body is preferably designed to be rotationally symmetrical, so that as few imbalances and vibrations as possible are caused on the handrail that is guided over it. The base body does not necessarily have to be rigid, such as a steel roller, but can also be made from a more resilient material such as fiber-reinforced plastics material or even from a flexible material such as elastomers, provided that it can be easily rotated in the housing. Logically, a composite of different materials is also possible in order to build up the base body and to provide it with advantageous properties such as dimensional rigidity in the bearing points and higher resilient properties in the region of the cleaning facing.

In the housing of the handrail treatment device, there can be at least one wiping element, the wiping edge of which interacts with the cleaning tips of the cleaning facing. These cleaning tips are the bristle tips in the case of a bristle facing, lamellar tips in the case of a lamellar facing, and the porous surface in contact with the handrail in the case of another material such as a foam ring serving as a cleaning facing. In this way, the dirt removed from the handrail and possibly stuck in the cleaning facing is continuously removed therefrom, so that mainly regions of the cleaning facing that have been mechanically cleaned in this way reach the handrail again.

In one embodiment, the wiping element can have a lip or lamella made of flexible material. The wiping edge is formed on this lip. As a result, the cleaning tips that come into contact with the lip are exposed to lower mechanical forces and their service life is increased as a result. In addition, the cleaning tips that sweep past the lip generate vibrations which, although they encourage the dirt to be shaken off from the cleaning facing, are transferred to the housing only in a damped manner due to the flexible lip. In this way, the noise generated by the handrail treatment device can be reduced considerably during operation.

In an alternative embodiment, the wiping element can have a wiping brush, the bristle tips of which form the wiping edge. The effective properties of the wiping brush are substantially the same as in the previously described embodiment of the wiping element having a lip. Depending on the design of the cleaning facing (bristle thickness, bristle density, arrangement of the bristles or bristle bundles, the shape and rigidity of the lamellae, etc.), the version with a lip or the version with a wiping brush cleans the cleaning facing better, so that the selection is made preferably in an experimental manner.

In one embodiment of the handrail treatment device, the cylindrical base body can be driven by the movement of the handrail guided over it. In order to achieve a sufficient cleaning effect, however, a speed difference between the surface of the handrail and the cleaning tips of the cleaning facing is required. Such a speed difference can be achieved in that the rotational movement of the base body or the cleaning facing is continuously braked, but without completely blocking it. The wiping element is particularly suitable for this purpose, which interacts with the cleaning tips of the cleaning facings in such a way that when the handrail is moved, this results in a braking effect on the cylindrical base body and, as a result, there is a differential speed between the surface of the handrail and the cleaning tips in contact therewith.

Alternatively, the cylindrical base body can also be driven by a motor. As a result, the rotational speed of the cylindrical base body can be preferably adjusted to the speed of the handrail so that there is a speed difference between the surface of the handrail and the cleaning tips touching it when the handrail is moved. This alternative has the advantage that the rotational speed of the base body can also be significantly higher than the speed of the handrail guided over it, so that a higher centrifugal force acting on the dirt particles can be used to remove dirt from the cleaning facing. Opposite directions of movement are also possible with this alternative embodiment.

In a further embodiment of the disclosure, the cleaning facing can be profiled orthogonally to the axis of rotation, so that a tread contour of the cleaning facing corresponds to an outer surface contour of the handrail to be guided over it or to be cleaned. As a result, not only the broad main surface on which the user's palms usually rest is cleaned, but also the two side surfaces, which are usually grasped by the user's fingers, are reached and brushed off by the cleaning facing.

In a further embodiment of the disclosure, the cylindrical base body can be cup-shaped and its cylinder jacket can have openings. The cleaning facing is arranged on the existing or remaining cylinder outer surface of the cylinder jacket. The interior of the cup-shaped base body can also be illuminated by means of the radiation source or a further radiation source in such a way that its germicidal electromagnetic radiation is passed through the openings to the cleaning facing. With this development of the disclosure, the cleaning facing can also be reached and disinfected in depth by the germicidal electromagnetic radiation.

In a further embodiment of the handrail treatment device, a dirt protection for the at least one radiation source can be arranged in the housing so that dirt swirling around in the housing does not adhere directly to the radiation source. Such a dirt protection can for example, be a transparent cover of the radiation source or guide bodies of any kind that keep the dirt particles away from the radiation source. The dirt protection can also be, for example, a suction device similar to a vacuum cleaner, which sucks the swirling dirt particles directly and thus removes them from the region of the radiation source and the cylindrical base body before they can settle and collect in the housing.

In a further embodiment of the handrail treatment device, a cleaning device for the at least one radiation source can also be arranged in the housing. There are various possibilities for this, such as compressed air nozzles directed at the radiation source, wiper systems that can be operated electromechanically or manually, and the like.

In a further embodiment of the handrail treatment device, with regard to the direction of movement of the handrail, there can be a region having radiation sources downstream of the cylindrical base body having a cleaning facing. By means of their germicidal electromagnetic radiation, at least part of the handrail surface of the handrail can be irradiated. A handrail treated in this way leaves the handrail treatment device almost free of germs. If both possible directions of transport or directions of movement are provided for the passenger transport system, there can also be two regions with radiation sources for irradiating the handrail surface, the cylindrical base body in this case being arranged between the two regions. In order to save energy, for example, the two regions can be controlled depending on the direction of movement, so that only the region arranged after, and therefore downstream, of the cylindrical base body emits germicidal electromagnetic radiation.

Since the rotating cylindrical base body with its cleaning facing can whirl around removed dirt particles, the handrail treatment device preferably has a substantially closed housing through which the handrail is passed via an inlet opening and an outlet opening. In order to be able to carry out the handrail more easily when changing, the housing is preferably designed in two parts and has a U-shaped main housing part and a cover spanning the open side of the main housing part.

A passenger transport system that is designed as an escalator or moving walkway has at least one balustrade that comprises at least one circulating handrail, onto which the user can hold while moving. Usually there are two balustrades that extend on both sides of a conveyor belt of the passenger transport system. At least one handrail treatment device according to the disclosure is preferably provided for each circulating handrail.

In most cases, the balustrade comprises a balustrade base in which a return run of the handrail is concealed from the users of the passenger transport system. The balustrade base therefore offers the possibility of installing the handrail treatment device also concealed from the view of the user inside the balustrade base of the balustrade.

As is known, a passenger transport system designed as a moving walkway or escalator has a drive motor for driving the handrail and a drive controller for controlling the drive motor. The at least one radiation source of the variants of the embodiment of the handrail treatment device described above can be controlled as a function of a speed signal and/or direction of movement signal from the drive controller to the drive motor. As a result, it can be achieved, for example, that the at least one radiation source only emits germicidal electromagnetic radiation when the handrail is in motion. Of course, the rotational speed and/or direction of rotation of the cylindrical base body can also be controlled as a function of these signals if the base body is driven by a motor.

BRIEF DESCRIPTION OF THE DRAWINGS

Embodiments of the disclosure will be described in the following with reference to the accompanying drawings, with neither the drawings nor the description being intended to be interpreted as limiting the disclosure. Furthermore, the same reference signs are used for elements that are identical or have the same effect. In the drawings.

DETAILED DESCRIPTION

Figure 1:
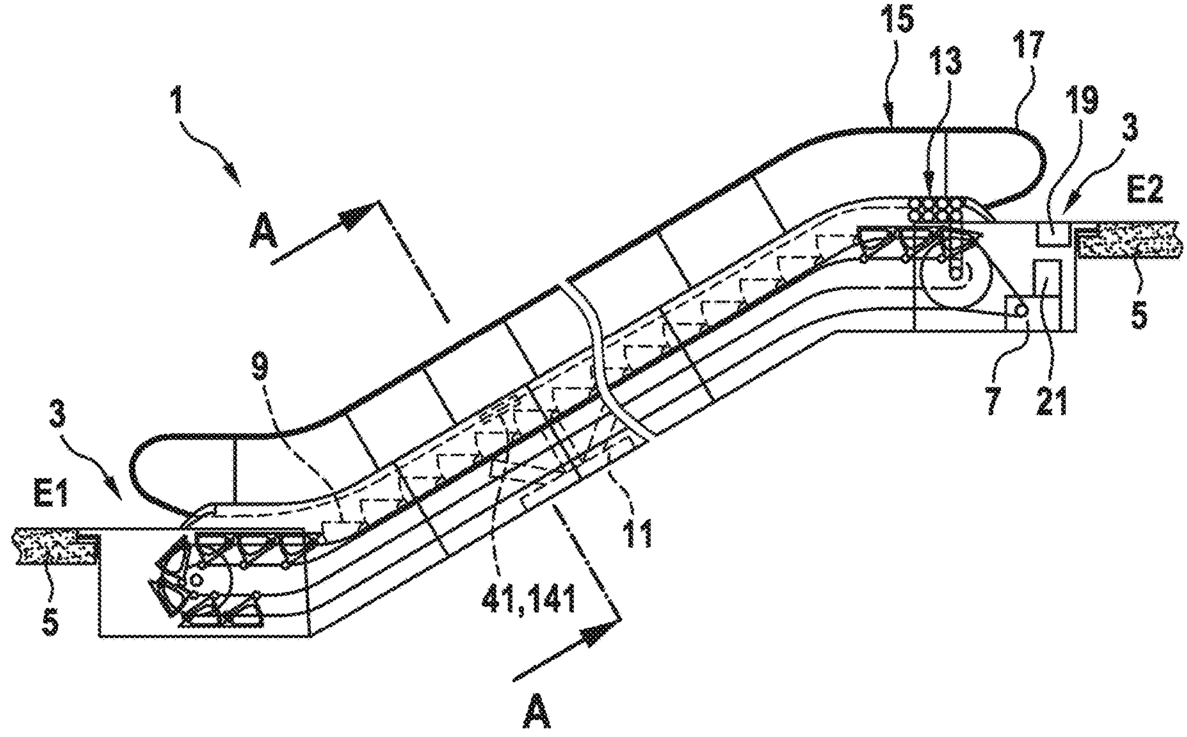
FIG. 1: is a simplified view of a passenger transport system designed as an escalator having a handrail treatment device.

FIG. 1 shows a simplified view of a passenger transport system 1 with a supporting structure 11 designed as a framework. The passenger transport system 1 designed as an escalator connects a lower level E1 with an upper level E2 of a building 5. The passenger transport system 1 can be entered and exited again by users via access regions 3. A circulating step belt 9 is arranged in the supporting structure 11, which is deflected in the upper level E2 and in the lower level E1 and thus has a leading portion and a returning portion. For the sake of a better overview, the detailed representation of the returning portion, as well as a detailed representation of frames, guide rails, and rail blocks, has been omitted.

The passenger transport system 1 also has two balustrades 15 which extend along each longitudinal side of the step belt 9, only the balustrade 15 arranged in the foreground in the viewing plane being visible in FIG. 1. A handrail 17 is arranged in a circulating manner on each balustrade 15, the returning run of which is guided in a balustrade base 13. This balustrade base 13 connects the balustrade 15 to the supporting structure 11. In other words, the return run of the handrail 17 is concealed from the users of the passenger transport system 1 and is guided in the balustrade base 13.

The step belt 9 and the handrail 17 can be driven by a drive unit 7 of the passenger transport system 1, which drive unit 7 has a drive motor 21. The directions of movement of the handrails 17 and the step belt 9 as well as their speed are specified by a controller 19 which controls the drive motor 21 by means of control signals, for example, via a frequency converter (not shown).

Furthermore, the passenger transport system 1 has at least one handrail treatment device 41, 141 for each circulating handrail 17. This is also installed in the balustrade base 13 of the balustrade 15 and thus concealed from the users of the passenger transport system 1.

Figure 2:
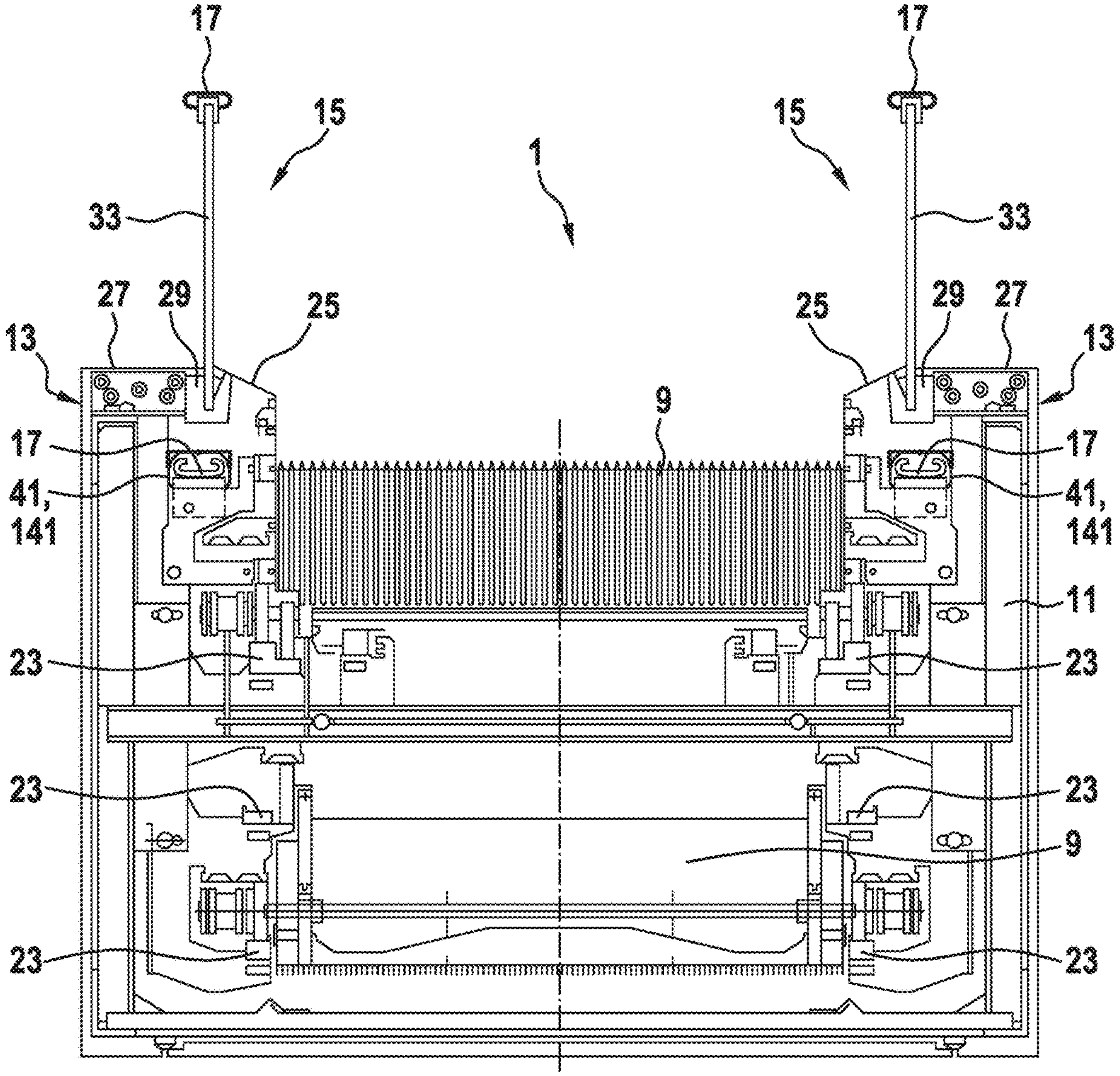
FIG. 2: is a cross section along the line A-A through the passenger transport system of FIG. 1.

FIG. 2 shows a cross section through the passenger transport system 1 according to FIG. 1 along the line A-A. In this cross section, both the leading and the returning portion of the step belt 9 can be seen. The step belt 9 is guided on guide rails 23 within the supporting structure 11. A balustrade 15 and a balustrade base 13 are arranged to the left and right of the leading portion of the step belt 9, which is arranged at the top when the passenger transport system 1 is installed as intended. Clamping devices 29 are provided within the balustrade base 13, concealed by cladding panels 25, 27, which serve as clamping receptacles for the individual balustrade panels 33. In this case, the balustrade panel 33 is clamped in a stationary manner at its lower end in at least one of the clamping devices 29. The clamping devices 29 are arranged along the longitudinal extension of the passenger transport system 1 within the balustrade base 13 on the supporting structure 11. A handrail treatment device 41, 141 is provided below the clamping devices 29 for each handrail 17 arranged in a circulating manner on the balustrade 15.

Since the returning run of the handrail 17 is also guided in the balustrade base 13, it is advantageous to arrange the handrail treatment device 41, 141 in the balustrade base 13 and in this case, depending on the design, to guide the returning run over or through the handrail treatment device 41, 141. This can ensure that users of the passenger transport system 1 cannot come into contact with the handrail treatment device 41, 141.

Figure 3:
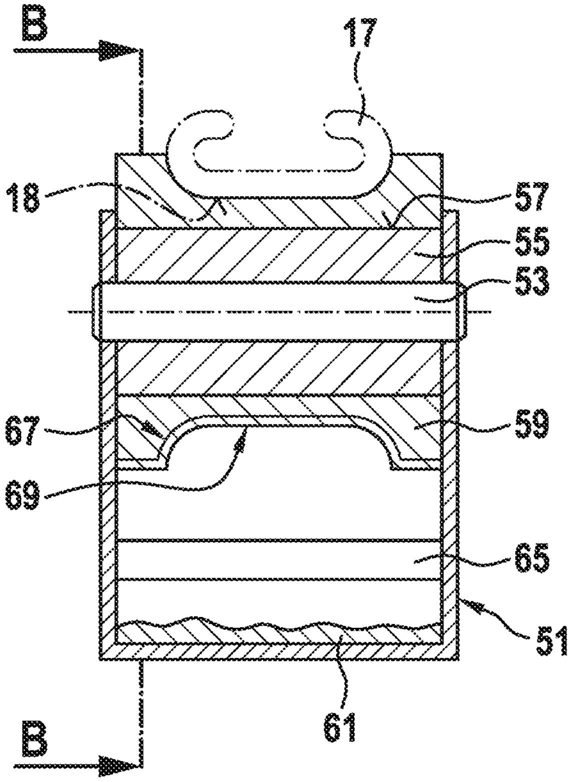
FIG. 3: is a front view of the handrail treatment device shown in FIGS. 1 and 2 in a first embodiment.
Figure 4:
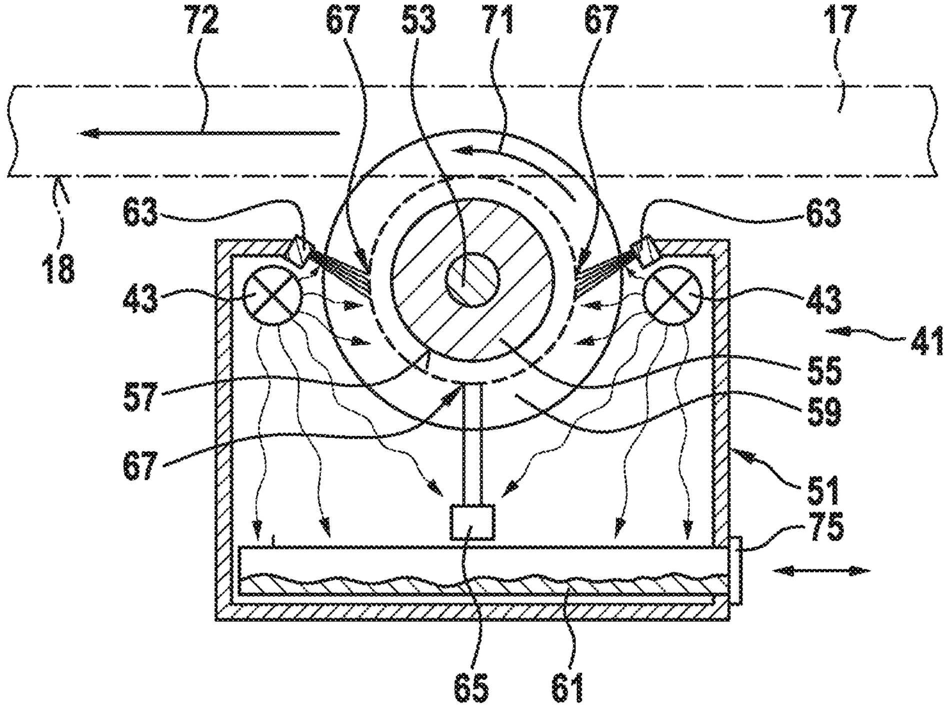
FIG. 4 is a cross section along the line B-B through the handrail treatment device shown in FIG. 3.

FIG. 3 shows, in a front view, a first embodiment of the handrail treatment device 41 shown in FIGS. 1 and 2. FIG. 4 shows a cross section along the line B-B through the handrail treatment device 41 shown in FIG. 3. In the following, both FIGS. 3 and 4 shall be described jointly.

This embodiment comprises a housing 51 and a cylindrical base body 55 which is arranged in the housing 51 so as to be rotatable about an axis of rotation 53. A cleaning facing 59 is arranged on a cylinder outer surface 57 of the base body 55, over which cleaning facing 59 the handrail 17 can be guided so that dirt particles 61 can be removed from its handrail surface 18. The movement of the handrail 17 drives the cylindrical base body 55 as a result of the friction between the cleaning facing 59 and the handrail surface 18.

In addition, two radiation sources 43 which can emit germicidal electromagnetic radiation are arranged inside the housing 51. For this purpose, fluorescent tubes or light-emitting diodes are preferably used which, for example, can emit ultraviolet light in the wavelength range from 200 nm to 280 nm, so-called UV-C light, but other radiation sources 43 that can emit germicidal radiation are also possible. Logically, for sufficient irradiation, a row of UV-C LEDs with overlapping light cones is required in order to obtain the disinfection effect on the same width of the housing 51 as in one of the UV-C fluorescent tubes shown.

The two radiation sources 43 are aligned with the base body 55 in such a way that the cleaning facing 59 moving continuously past the radiation sources 43 is exposed to the germicidal electromagnetic radiation of the radiation sources 43 when the base body 55 rotates. This disinfects the cleaning facing 59 and the dirt removed from the handrail by the cleaning facing 59, so that the handrail 17 is continuously cleaned through the disinfected regions of the cleaning facing 59 and bacteria and viruses are not reapplied to the handrail surface 18 by the rotating cleaning facing 59.

Furthermore, three wiping elements 63, 65 are arranged in the housing 51, the wiping edges 67 of which interact with cleaning tips 69 of the cleaning facing 59. As a result, for example, the bristles or lamellae of the cleaning facing 59 are locally spread apart so that the dirt 61 can better fall out of the gaps in between and, on the other hand, the electromagnetic radiation can penetrate deeper between the bristles or lamellae. Furthermore, the wiping elements 63, 65 brake the rotational speed of the cylindrical base body 55, so that a speed difference arises between the handrail surface 18 and the cleaning tips 69. This fact is shown symbolically in FIG. 4 by the arrows 71, 72 of unequal length for the handrail speed of the handrail 17 and the rotational speed of the cylindrical base body 55.

The wiping element 65 can have a lip made of flexible material, the wiping edge 67 being formed on the lip. The wiping element 63 can, however, also be a wiping brush, the bristle tips of which form the wiping edge 67. In principle, all wiping elements 63, 65 of a handrail treatment device 41 can have the same design. As can be clearly seen in FIG. 4, a combination of the two design variants of the wiping element 63, 65 can also be used in the same device.

In order to be able to remove the dirt particles 61 collected in the housing 51, a dirt removal device 75 can be provided. In the present embodiment, this is a simple drawer that can be emptied by the service staff from time to time. Of course, a connection for a suction device can also be present on the housing 55 as a dirt removal device 75 in order to be able to automatically suck off the dirt 61 continuously or periodically.

Figure 5:
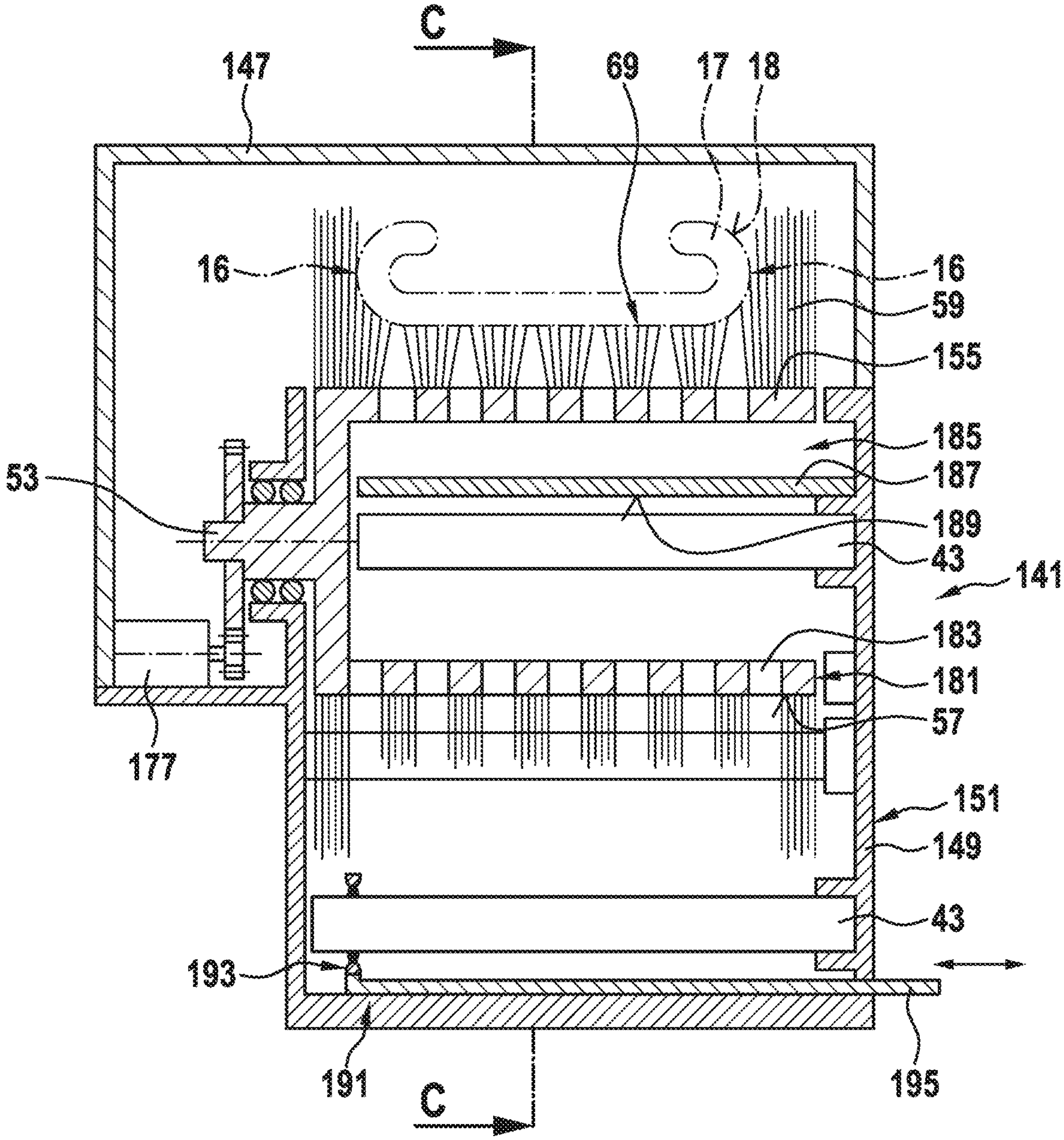
FIG. 5: is a front view of the handrail treatment device shown in FIGS. 1 and 2 in a second embodiment.
Figure 6:
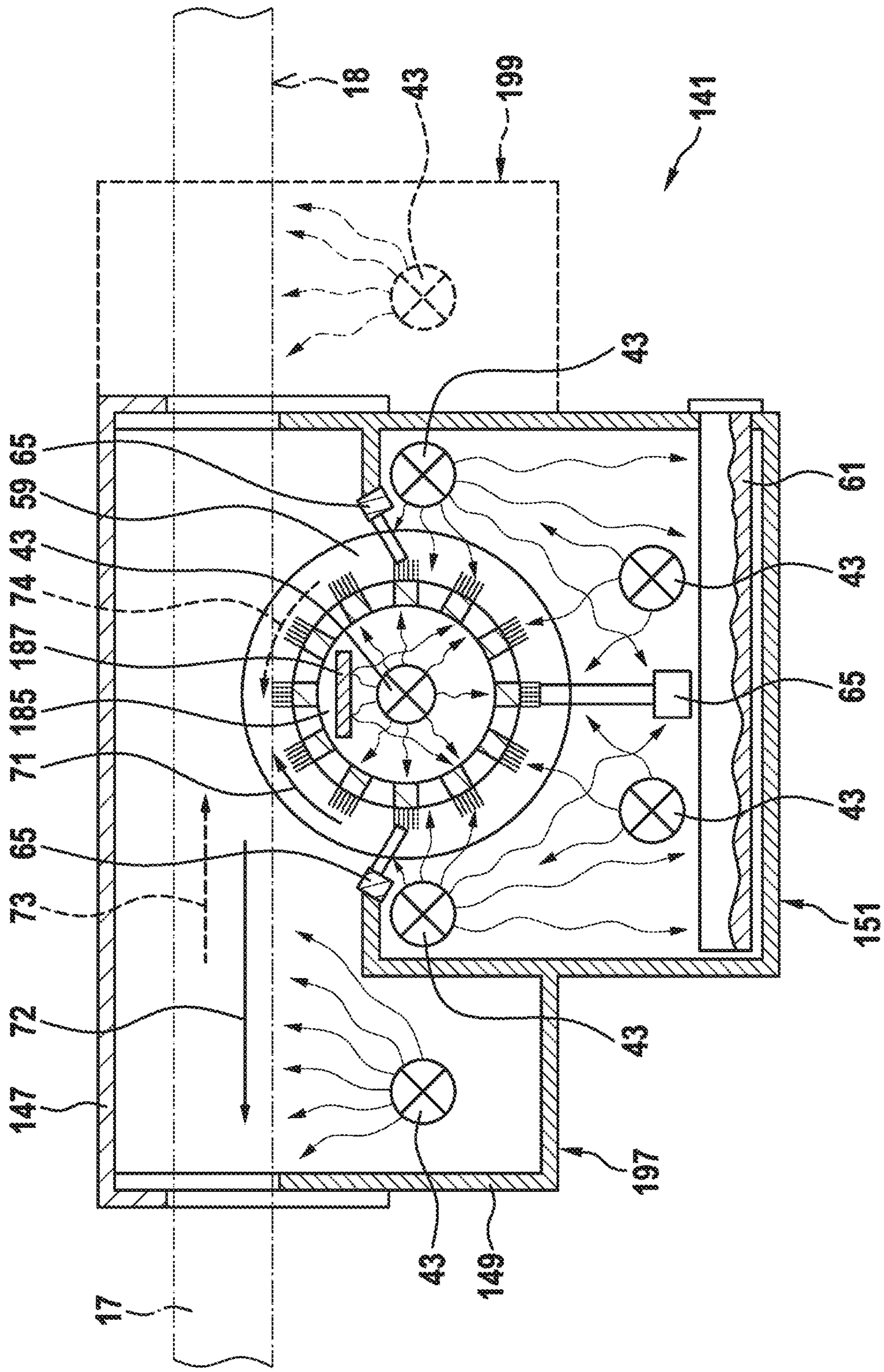
FIG. 6 is a cross section along the line C-C through the handrail treatment device shown in FIG. 5.

FIG. 5 is a front view of the handrail treatment device 141 shown in FIGS. 1 and 2 as a second embodiment. FIG. 6 shows a cross section along the line C-C through the handrail treatment device 141 shown in FIG. 5. In the following, both FIGS. 5 and 6 shall be described jointly.

The second embodiment, like the first embodiment, also has a plurality of components that have the same effect, such as a housing 151 and a cylindrical base body 155 arranged therein so as to be rotatable about an axis of rotation 53. Wiping elements 65 and radiation sources 43 for germicidal, electromagnetic radiation such as UV-C light are also arranged in the housing 151.

One of the substantial differences from the first embodiment is that the cylindrical base body 155 can be driven by a motor 177. In this case, the rotational speed of the cylindrical base body 155 is preferably adjusted to the speed of the handrail 17 so that there is a speed difference between the surface 18 of the handrail 17 and the cleaning tips 69 touching it when the handrail is moved. If necessary, a direction of rotation of the base body 155 opposite to the handrail surface 18 can also be selected, as is indicated by the arrows 71, 72, 73, 74 shown with a solid line or a broken line.

Another difference is that the cylindrical base body 155 is cup-shaped and its cylinder jacket 181 has openings 183. The cleaning facing 59, bristles in the present embodiment, is arranged on the cylinder outer surface 57 of the present cylinder jacket 181. The interior 185 of the cup-shaped base body 155 is illuminated by the radiation source 43 arranged therein in such a way that its germicidal electromagnetic radiation reaches the cleaning facing 59 through the openings 183.

A dirt protection 187 for the radiation source 43 is arranged in the housing 151 such that dirt 61 does not collect on the upper side of the radiation source 43 due to gravity. This can also be provided with a reflective surface 189 directed towards the radiation source 43, so that the radiation striking the reflective surface 189 is reflected into other regions of the interior 185 of the base body 155.

As shown in FIG. 5, a cleaning device 191 can also be present for at least one of the radiation sources 43. This is designed, for example, as a brush ring 193, which can be moved over the radiation source 43 by means of an actuating linkage 195. A cleaning device 191 and/or a dirt protection 187 is preferably arranged in the housing 151 for each of the radiation sources 43.

As can be seen from FIG. 6, the second embodiment of the handrail treatment device 141 has a region 197, 199 having radiation sources 43, which is located downstream of the cylindrical base body 155 having a cleaning facing 59. This downstream region 197, 199 is adjusted to the direction of movement of the handrail 17, e.g., it is arranged such that the germicidal electromagnetic radiation from its radiation source 43 irradiates the handrail 17 cleaned by the cleaning facing 59. If the passenger transport system 1 can be operated in both conveying directions, such downstream regions 197, 199 can also be present on both sides of the base body 155, as indicated by the broken lines. For example, the radiation sources 43 can then be controlled depending on the conveying direction of the passenger transport system 1.

In order to protect the cleaning facing 59 from environmental influences and, if necessary, in order to cover the radiation sources 43 of the downstream regions 197, 199 for safety reasons, the housing 151 can be designed in two parts and can have a main housing part 149 having an open side and a cover 147 spanning the open side of the main housing part 149.

In the two embodiments of the handrail treatment device 41, 141 described above, the cleaning facing 59 is also profiled orthogonally to the axis of rotation 53 so that a tread contour of the cleaning facing 49 corresponds to an outer surface contour of the handrail 17 to be guided. As a result, the side flanks 16 of the handrail 17 can also be cleaned and disinfected.

Although FIGS. 1 to 6 show different aspects of the present disclosure on the basis of a passenger transport system 1 designed as an escalator, which is intended to connect floors E1, E2 which are vertically spaced apart from one another, it is obvious that the handrail treatment device 41, 141 described also applies to obliquely arranged moving walkways or horizontally arranged moving walkways. In addition, the downstream regions 197, 199 can each have a plurality of radiation sources 43 and be arranged in different planes, so that the entire handrail surface 18 that can be touched by users of the passenger transport system can be irradiated directly by radiation sources. Furthermore, instead of a motor 177, it is also possible to use a friction wheel which detects the movement of the handrail 17 and which can drive the base body 155 via a step-down or step-up gear.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above. Reference signs in the claims are not to be considered to be limiting.

The invention claimed is:

1. A handrail treatment device, comprising:
- at least one housing; and
- a cylindrical base body rotatably arranged in the housing about an axis of rotation;
- a cleaning facing is arranged on an outer surface of the cylindrical base body over which a circulating handrail of a passenger transport system designed as an escalator or moving walkway can be guided for cleaning,
- wherein at least one radiation source is arranged inside the housing and outside of the cylindrical base body and configured to emit germicidal electromagnetic radiation, wherein the radiation source is exteriorly aligned with the cylindrical base body in such a way that the cleaning facing moving continuously past the radiation source is exposed to the germicidal electromagnetic radiation of this radiation source to clean the cleaning facing when the cylindrical base body rotates.

2. The handrail treatment device of claim 1, further comprising at least one wiping element in the housing, a wiping edge of the wiping element interacting with cleaning tips of the cleaning facing.

3. The handrail treatment device of claim 2, wherein the wiping element has a lip made of flexible material and the wiping edge is formed on the lip.

4. The handrail treatment device of claim 2, wherein the wiping element has a wiping brush, bristle tips of which form the wiping edge.

5. The handrail treatment device of claim 2, wherein the cylindrical base body is driven by movement of the handrail being guided over it and the wiping element interacts in such a way with the cleaning tips of the cleaning facing that, when the handrail is moved, a braking effect takes place on the cylindrical base body and, as a result, there is a differential speed between the handrail surface of the handrail and the cleaning tips.

6. The handrail treatment device of claim 1, wherein the cylindrical base body is driven by a motor and the rotational speed of the cylindrical base body is adjusted to the speed of the handrail so that there is a speed difference between the handrail surface of the handrail and cleaning tips of the cleaning face when the handrail is moved.

7. The handrail treatment device of claim 1, wherein the cleaning facing is profiled orthogonally to the axis of rotation so that a tread contour of the cleaning facing corresponds to an outer surface contour of the handrail to be guided.

8. The handrail treatment device of claim 1, wherein the cylindrical base body is cup-shaped and a cylinder jacket thereof has openings, wherein the cleaning facing is arranged on the existing cylinder outer surface of the cylinder jacket, and wherein the interior of the cup-shaped base body can be illuminated by the radiation source in such a way that its germicidal electromagnetic radiation is passed through the openings to the cleaning facing.

9. The handrail treatment device of claim 1, wherein a dirt protection is arranged in the housing for the at least one radiation source.

10. The handrail treatment device of claim 1, wherein a cleaning device is arranged in the housing for the at least one radiation source.

11. The handrail treatment device of claim 1, wherein, with reference to a direction of movement of the handrail, a region having radiation sources downstream of the cylindrical base body having a cleaning facing is present, at least part of the handrail surface of the handrail being able to be irradiated by means of germicidal electromagnetic radiation of the radiation sources.

12. The handrail treatment device of claim 1, wherein the housing is designed in two parts and has a main housing part having an open side and a cover covering the open side of the main housing part.

13. A passenger transport system which is designed as an escalator or a moving walkway, comprising at least one balustrade which comprises at least one circulating handrail, wherein the passenger transport system has at least one handrail treatment device for each circulating handrail according to claim 1.

14. The passenger transport system of claim 13, wherein the balustrade comprises a balustrade base in which a return run of the handrail is guided so as to be concealed from the users of the passenger transport system and wherein the handrail treatment device is installed in the balustrade base of the balustrade.

15. A method for controlling a handrail treatment device in a passenger transport system according to either claim 13, wherein the passenger transport system has a drive motor for driving the handrail and a drive controller for controlling the drive motor, the at least one radiation source of the handrail treatment device being controlled as a function of a speed signal and/or movement direction signal from the drive controller to the drive motor.

* * * * *